(No Model.) 2 Sheets—Sheet 1.
W. OLIPHANT.
APPARATUS FOR LIQUID PURIFICATION.
No. 390,512. Patented Oct. 2, 1888.
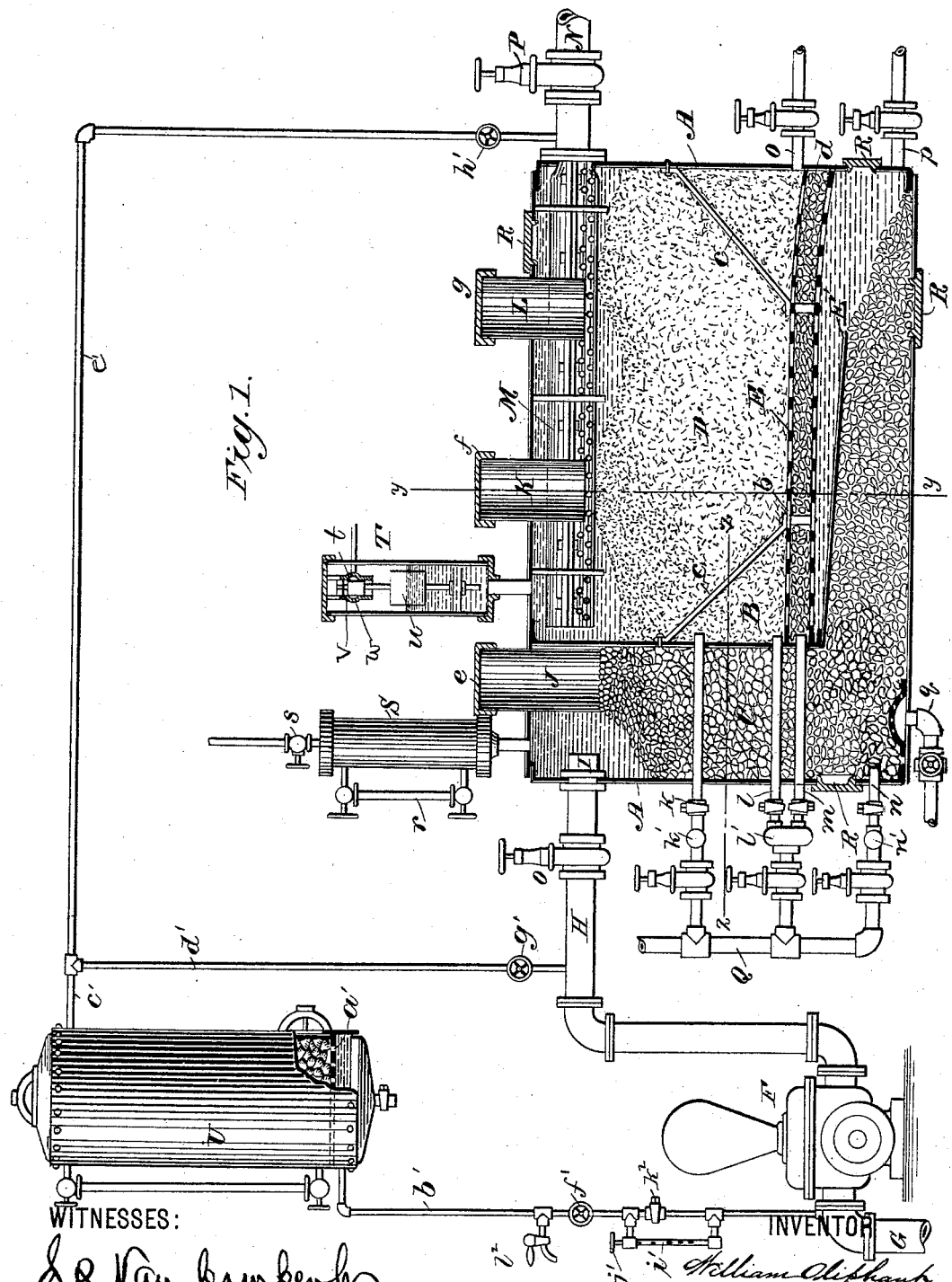

(No Model.) 2 Sheets—Sheet 2.
W. OLIPHANT.
APPARATUS FOR LIQUID PURIFICATION.
No. 390,512. Patented Oct. 2, 1888.
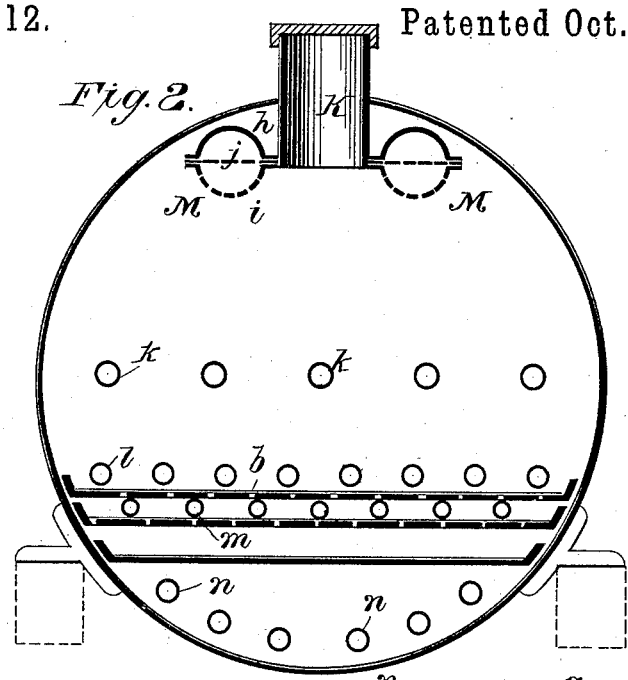
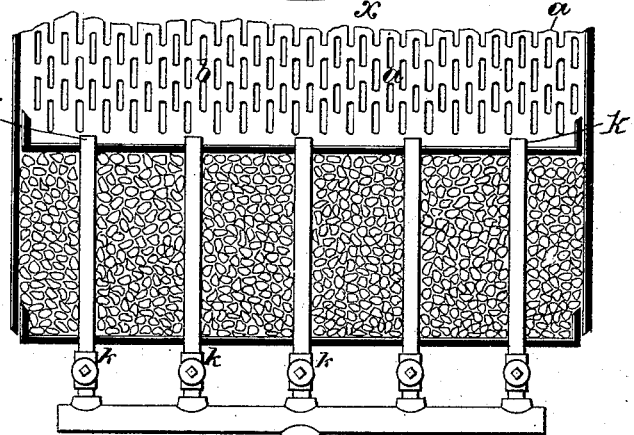
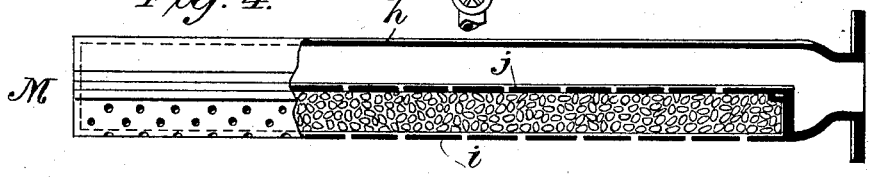
WITNESSES:
INVENTOR
William Oliphant
BY
Chas. W. Forbes
ATTORNEY

UNITED STATES PATENT OFFICE.

WILLIAM OLIPHANT, OF JERSEY CITY, NEW JERSEY.

APPARATUS FOR LIQUID PURIFICATION.

SPECIFICATION forming part of Letters Patent No. 390,512, dated October 2, 1888.

Application filed January 24, 1888. Serial No. 261,717. (No model.)

*To all whom it may concern:*

Be it known that I, WILLIAM OLIPHANT, a citizen of the United States, residing at Jersey City, county of Hudson, State of New Jersey, have invented certain new and useful Improvements in Apparatus for Liquid Purification, of which the following is a specification that will enable others skilled in the art to which my invention appertains to understand and use the same, reference being had to the accompanying drawings.

This invention relates to purification of water or other liquid by mechanical filtration under pressure, and is adaptable, also, to assisted precipitation of impurities by coagulants.

In practice heretofore the process of filtration has been periodically interrupted by reason of the release from pressure in the apparatus and laborious method required for removing and substituting the fouled portion of the filter-bed with fresh material at intervals which are frequently necessary.

The object sought is to economize the time and labor involved in the said practice, and to render the cleansing of the filtrate more effectual by the greater frequency of the renewing operation made practicable.

The invention therefore consists in subjecting the liquid to two or more separate filtrations, first, through a partly-horizontal bed of comparatively coarse material, which arrests the larger percentage of impurities, and which, by reason of its horizontally-directed current, is made capable of frequent renewing by automatic means, as hereinafter described, without essential interference with the continuous action of filtration, and, second, through a bed or beds of comparatively fine material, in which upward filtration is preferably employed, and which takes up the remaining impurities, the necessary periods of renewal therein being of less frequent requirement, and then only involving momentary interruption of filtration without a release of pressure, the means of renewal being also automatic, promoting a substantially constant action of the apparatus.

Referring to the drawings, Figure 1 is a longitudinal sectional elevation on the line *x x*, Fig. 2, of the filter and appurtenances connected therewith; Fig. 2, a cross section of the filter on the line *y y*, Fig. 1; Fig. 3, a partial horizontal section on the line *z z*, Fig. 1, and Fig. 4 a detail view.

The filtering-vessel A is subdivided into chambers C and D by means of a partition, B, and perforated or porous diaphragm E, Figs. 1, 2, and 3. The said diaphragm E is preferably of the construction shown, composed of a double perforated plate containing a gravel or other like filling, but may be otherwise constructed, if preferred, as in the form of a single perforated plate, wire-netting, or porous mineral, or other diaphragm. The construction shown consists of an upper and a lower perforated plate, each having oblong perforations *a*, Fig. 3, braced together by stays *b*, secured to the filter-shell about their margins, and suspended firmly in place by means of brace-rods *c* to prevent displacement under the weight of the filtering-bed to be sustained thereupon. The filling, *d*, of gravel or the like is of a grade of larger size than the orifices of the plates which are to hold it, and has the function of preventing the passage of the fine filtering material downward out of the chamber D, especially during the washing-out and replacing operation applied to said material, as hereinafter described.

E' is an apron, of sheet metal, for retaining the filtering material of the lower chamber in place and directing the current throughout the latter before its access to diaphragm E.

F is a force-pump, shown as an illustration of a suitable source of liquid-supply under pressure.

G is the suction-pipe, and H the delivery-pipe, of said pump, the latter pipe entering, preferably, at the top of the chamber C through nozzle I, and the liquid, being thrown against the cylindrical structure J, is spread laterally, and the current equally distributed at its point of entrance to the filtering-bed in C, at the top thereof.

J K L are charging funnels or hoppers, through which the filtering material is introduced at times when the apparatus is relieved of pressure for the purpose, and in sufficient quantities to supply the filter for a considerable length of time. The caps *e f g* of said funnels are removable by means of screw-threads, yokes, or other well-known devices, whereby they are pressure-tight when adjusted in place.

M is a bifurcated interprolongation of the filter delivery-pipe N, serving as a separator, to insure against particles of matter from the bed in compartment D being carried over into said delivery-pipe. The structure of the part M is better illustrated by Figs. 2 and 4. The same consists of combined semi-tubular sections $h$ $i$, having an interposed perforated plate, $j$, subdividing the interior of said sections. The lower section, being perforated on its exterior and filled with gravel or the like, allows the inflow of the purified liquid therethrough and into pipe N. The induction and eduction liquid-pipes H and N are each provided with suitable valves, O P, respectively, adapted to partly or wholly close and regulate the flowing capacity of said pipes.

The means I employ for automatic replacement of the foul portions of the filtering-beds consist in the application thereto of hydraulic force through the several series of washing-pipes $k$, $l$, $m$, and $n$, connected through manifolds $k'$ $l'$ $n'$ and pipe Q to a suitable source of hydraulic pressure, or connected directly to the pump delivery-pipe H, if desired. The water thus forced into the lower or fouled portions of the filter-beds or through the gravel filling of the diaphragm E at such points as are, for instance, indicated, is permitted to escape through the discharge or blow-off pipes $o$ $p$ $q$, located as indicated, or elsewhere, if desirable, and adapted to convey with the outgoing current the lowermost portions of the filtering mass. Such various inflow and outflow pipes are suitably provided with separate regulating valves and cocks, as will be understood by an inspection of the figures.

Suitable man-holes or hand-holes, as R R, are provided at various parts of the shell, such as may afford necessary access to the interior for cleaning or other obvious purposes.

S T are accumulators for receiving and automatically discharging such portions of air as may rise to the top of the chambers. They are provided either with water-gages $r$ and hand-valves $s$ or with automatic balanced discharge valves $t$, controlled by a float, $u$, or both. The valve $t$, shown for illustration, consists of a piston having a circumferential grooved port, $v$, adapted to coincide with the port $w$ in the valve-casing when the float is depressed below its normal position, and thereby open communication between the chamber and the exterior air.

U is a vessel containing the coagulating agent, as sulphate of alumina, the same being suspended upon a perforated sheet, $a'$, within the pressure-tight tank. The tank U is connected at its lower portion beneath said perforated sheet by a tube, $b'$, with the suction side of the pump, and at its upper portion by a tube, $c'$, with the pump delivery-pipe H through branch $d'$ or to the filter delivery-pipe N through branch $e'$, thus promoting a circulation from the pressure side of said pump to the top of the tank U and downward through the coagulant, thence to the point of filtrate supply.

The tubes $b'$ $d'$ $e'$ are controlled by suitable cocks, $f'$ $g'$ $h'$. The tube $b'$ is provided with an indicating drip tube, $i'$, of glass, through which the amount of liquid charged with coagulant may be observed, and regulated by cock $f'$ or by an adjusting-valve, $j'$, the cock $k^2$ being kept closed.

The operation is as follows: The compartments C and D of the apparatus being filled nearly to the top with the different grades of filtering material as specified, said material consisting of sand, pulverized coke, charcoal, or other well-known filtering substance through the funnels or hoppers J K L, and said hoppers closed, the filter is charged with the water or other liquid to be filtered at the desired working pressure by means of the pump F. The impurities are mechanically separated in part, uniformly through the coarser bed, C, passing first downward, and then horizontally and around the apron E', are forced upward through the diaphragm E, into and through the finer bed, D, the extreme lower portion of the latter adjacent to the diaphragm E, taking up the remaining impurities. Thence the liquid is conveyed out of the filter through the gravel or other sand-retaining separator in pipe-extension M.

I find it preferable to employ an upward current in the filtering process, allowing the current to strike the heavier portion of the bed first; and in the washing-out method which I employ I apply the expelling force to the fouled material, therefore, at the lower portion of the bed D, adjacent to the diaphragm E, through the series of washing-out pipes $l$. The valve P is closed during this operation and the blow-off pipe or pipes $o$ are opened, so that said fouled material is horizontally discharged through pipe $o$, allowing the mass of fresh material above to remain comparatively undisturbed by reason of the great force of horizontal flow from pipes $l$, and to subsequently settle as the washing operation ceases upon the diaphragm E. This operation occupies but a brief period, and is of rare requirement, owing to the preceding filtration which has separated the bulk of impurities in the chamber C, which, owing to the horizontal current therein, may be subjected to frequent blowing out of its lower portion by means of the series of washing-pipes $n$ and blow-off pipe or pipes $p$, without materially interrupting the flow of filtrate through the upper section of its horizontal portion. In performing the renewing operation of the bed C it is found preferable to partly close the valve P in the filter-discharge pipe and utilize a portion of the filtrate to assist in eliminating the arrested impurities from the upper as well as the lower portion of said bed C, and also in driving down the upper or comparatively new material thereof to replace the lower.

A blow-off pipe, $q$, is provided at the point shown, intermediate between the point of washing-discharge $p$ and the induction-point I, to afford a more direct blow-current, if desired, to cleanse the upper portion of said bed C.

The gravel diaphragm E has also like means of washing out by the pipes m, entering between the perforated sheets and discharging such impurities as may accumulate by the blow-off pipe p.

The washing-pipes K are designed more particularly to disturb and make over the entire body of the bed D when occasioned by the tendency of the water or other liquid to gradually form channels therein. This evil, however, is caused largely by an excess of charged air introduced with the liquid, and the function of the accumulators S T is to remove this surplus air, the same being occasionally ejected by the cock s or automatic valve t, as hereinbefore described.

For purification in the instance of water from clay or peaty matters by means of sulphate of alumina, or from magnesia salts by the use of lime, the coagulant is placed in the tank U, as described, and by force of the current admitted thereto by the tubes $d'$ or $h'$ is carried in solution in regulated quantities through the drip-tube $i'$ to the suction side of the pump F. By this means of introduction the coagulant is thoroughly diffused through the liquid by the churning action of the pump prior to its delivery to the filter, giving thereby its maximum effect of precipitation.

Having thus fully described my invention, what I claim, and desire to secure by Letters Patent, is—

1. A filtering-vessel composed of a horizontal cylindric body and comprising two separate filter-bed-containing compartments, said compartments separated by a vertical partition terminating at its lower portion with an approximately horizontal apron extending partly across said vessel beneath one of said compartments, the latter compartment provided at or near its lower portion with a perforated or porous bed-suspending diaphragm, substantially as and for the purposes set forth.

2. The herein-described filtering-vessel embodying two separate filter-bed compartments, the one adapted for downward and horizontal filtrate-current, the other for upward filtrate-current, each of said compartments having inlet and outlet washing-pipes located at or near their lower section on opposite sides thereof, adapted to give a horizontal washing or cleansing current, as and for the purposes set forth.

3. In a filtering apparatus, the combination of two or more filter-bed compartments, the first, or a portion thereof, extending horizontally and terminating at its point of delivery beneath the second bed or beds, and having a series of washing-pipes and a blow-off pipe or pipes located as described, to produce a current through the lower section of its horizontal portion in a direction common to the filtrate-current, whereby the latter has uninterrupted access to the said second bed or beds, for the purposes set forth.

4. In a filtering apparatus, the combination of a coarsely-pulverized filter-bed-containing chamber, and a finely-pulverized filter-bed-containing chamber, the latter located, as shown, to receive the upward filtrate-discharge of the said coarsely-pulverized bed, and having washing and blow-off pipes adapted to force a horizontal current therethrough, for the purposes set forth.

5. The combination, with a filter-bed chamber, of the herein-described filtrate eduction-pipe having an extension within said chamber composed of semi-cylindrical sections and interposed diaphragm, said diaphragm and one of said sections being perforated and adapted to receive and retain a granulate filling, for the purposes set forth.

WILLIAM OLIPHANT.

Witnesses:
CHAS. W. FORBES,
S. R. VAN CAMPEN, Jr.